(12) United States Patent
Wu

(10) Patent No.: US 12,316,054 B1
(45) Date of Patent: May 27, 2025

(54) RETRACTABLE POWER OUTLET

(71) Applicant: Foshan Shunde Heili Technology Co., Ltd, Foshan (CN)

(72) Inventor: Kaiming Wu, Foshan (CN)

(73) Assignee: Foshan Shunde Heili Technology Co., Ltd, Foshan (CN)

( * ) Notice: Subject to any disclaimer, the term of this patent is extended or adjusted under 35 U.S.C. 154(b) by 0 days.

(21) Appl. No.: 18/925,235

(22) Filed: Oct. 24, 2024

(30) Foreign Application Priority Data

Jan. 3, 2024 (CN) .......................... 202420022265.0

(51) Int. Cl.
*H01R 13/74* (2006.01)
*H01R 25/00* (2006.01)
*H02G 3/04* (2006.01)
*H02G 3/06* (2006.01)

(52) U.S. Cl.
CPC ........... *H01R 25/006* (2013.01); *H01R 13/74* (2013.01); *H02G 3/0487* (2013.01); *H02G 3/0608* (2013.01)

(58) Field of Classification Search
None
See application file for complete search history.

(56) References Cited

U.S. PATENT DOCUMENTS

| | | | | | |
|---|---|---|---|---|---|
| 4,003,536 | A | * | 1/1977 | Sekerich | F16M 11/2092 248/585 |
| 4,160,536 | A | * | 7/1979 | Krogsrud | F16M 13/02 248/280.11 |
| 4,213,591 | A | * | 7/1980 | Jaakkola | F21V 21/26 248/281.11 |
| 4,712,313 | A | * | 12/1987 | Gettleman | A45D 20/16 248/314 |
| 4,953,822 | A | * | 9/1990 | Sharber | F16M 11/24 248/281.11 |
| 6,064,426 | A | * | 5/2000 | Waterman | H04N 7/183 348/E7.087 |
| 6,550,734 | B1 | * | 4/2003 | Spadea | F16M 11/24 248/281.11 |
| 10,122,127 | B2 | * | 11/2018 | Swanson | A47B 97/00 |
| 2003/0075658 | A1 | * | 4/2003 | Beissel, Jr. | F16M 13/00 248/284.1 |
| 2013/0161465 | A1 | * | 6/2013 | Huang | F16M 11/08 248/278.1 |

* cited by examiner

*Primary Examiner* — Tho D Ta
(74) *Attorney, Agent, or Firm* — The Webb Law Firm

(57) ABSTRACT

A retractable power outlet is disclosed, including a mounting base and an outlet body arranged in front of the mounting base. A plurality of first connecting rods are arranged between the mounting base and the outlet body in sequence. The outlet body, the mounting base and the first connecting rods are all called unit components, and a connecting member is arranged between two adjacent unit components. Each of the connecting members is hinged with two unit components, with a hinged shaft at a respective hinged part vertically arranged. The connecting members are arranged at both ends of the first connecting rod.

10 Claims, 4 Drawing Sheets

RETRACTABLE POWER OUTLET

CROSS-REFERENCE TO RELATED APPLICATION

This application claims priority to Chinese Patent Application No. 202420022265.0, filed on Jan. 3, 2024, the disclosure of which is hereby incorporated by reference in its entirety.

BACKGROUND

Technical Field

The present disclosure relates to the field of electric components, and in particular to a retractable power outlet.

Technical Considerations

In certain situations, it is necessary to place power outlets in narrow or concealed locations, such as beneath a desk. However, when the outlet is fixed to the wall, users must reach into these narrow spaces to plug in or unplug devices, making the process inconvenient and difficult.

SUMMARY

The present disclosure aims at solving at least one of the technical problems in the prior art. To this end, the present disclosure provides an improved retractable power outlet.

The retractable power outlet according to non-limiting embodiments of the present disclosure includes a mounting base and an outlet body arranged in front of the mounting base. A plurality of first connecting rods are arranged between the mounting base and the outlet body in sequence. The outlet body, the mounting base and the first connecting rods are all called unit components, and a connecting member is arranged between two adjacent unit components. Each of the connecting members is hinged with two unit components, with a hinged shaft at a respective hinged part vertically arranged. The connecting members are arranged at both ends of the first connecting rod.

The retractable power outlet according to non-limiting embodiments of the present disclosure at least has the following technical effects: When in use, the mounting base may be fixed on a wall, and when a plug needs to be inserted or pulled out, the outlet body and the movable base may be moved away from the wall first, so that the outlet body can be moved to a relatively spacious place, which is convenient for the plug to be inserted or pulled out.

According to some non-limiting embodiments of the present disclosure, at least one of the plurality of connecting members is a connecting base, the connecting base is provided with two first hinged points, the two first hinged points are arranged at an interval, and the connecting base is respectively hinged with two adjacent unit components in the plurality of unit components through the two first hinged points. A mounting position of the mounting base and a mounting position of the retractable power outlet may have a certain lateral deviation, which is convenient for the mounting of the retractable power outlet.

According to some non-limiting embodiments of the present disclosure, a side of each first connecting rod is provided with a second connecting rod, and two ends of the second connecting rod are respectively hinged with two connecting members. The outlet body can keep an orientation unchanged when moving, which is convenient for the plug to be inserted or pulled out.

According to some non-limiting embodiments of the present disclosure, vertical positions of the plurality of first connecting rods are not coincident with each other. In this way, when the outlet body is close to the mounting base, the plurality of first connecting rods may be stacked along a vertical direction, and occupy less space in a front and rear direction, which is beneficial for the outlet body to be closer to the mounting base.

According to some non-limiting embodiments of the present disclosure, a number of the first connecting rods is two. In this way, general needs can be satisfied, and the retractable power outlet has a simple structure and low cost, which is conducive to popularization and application.

According to some non-limiting embodiments of the present disclosure, each of the first connecting rods is provided with a wiring structure. By arranging the wiring structure, the power cord for supplying power to the outlet body can be wired along the first connecting rod, thus preventing the power cord from sagging and shaking.

According to some non-limiting embodiments of the present disclosure, the outlet body is provided with the power cord, and the power cord is connected with the wiring structure. In this way, the power cord can be prevented from sagging and shaking, which reduces a risk that the power cord is accidentally pulled off.

According to some non-limiting embodiments of the present disclosure, the wiring structure is a wiring channel, and the wiring channel extends along an axial direction of the first connecting rod. In this way, the structure is simple, and the power cord can be connected with the first connecting rod by passing the power cord through the wiring channel.

According to some non-limiting embodiments of the present disclosure, the wiring channel is provided with two openings, and the two openings are respectively arranged at two ends of the first connecting rod. In this way, a length of the wiring channel is larger, and the wiring channel wraps the power cord to protect the power cord and improve the safety performance.

According to some non-limiting embodiments of the present disclosure, the two openings are both arranged on a peripheral wall of the wiring channel. In this way, the power cord can bypass the hinged shaft of the first connecting rod at the opening of the wiring channel, and the hinged shaft arranged at the end of the first connecting rod will not hinder the wiring of the power cord.

The additional aspects and advantages of the present disclosure will be given in part in the following description, and will become apparent in part from the following description, or will be learned through the practice of the present disclosure.

BRIEF DESCRIPTION OF THE DRAWINGS

The above and/or additional aspects and advantages of the present disclosure will be more apparent from the following description of the non-limiting embodiments in conjunction with the accompanying drawings, wherein.

DETAILED DESCRIPTION

Figure 1:
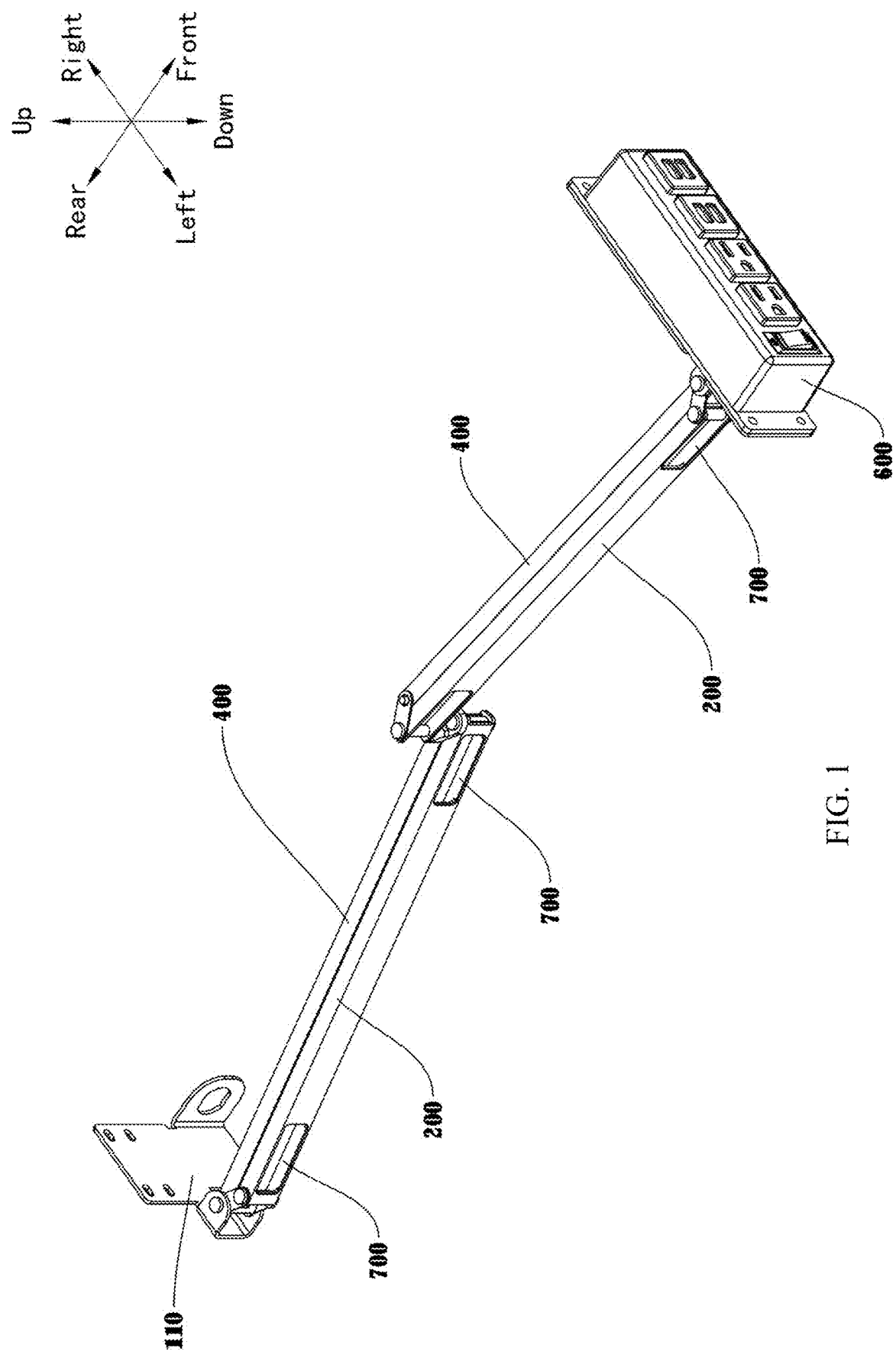
FIG. 1 is a schematic perspective view of a retractable power outlet according to some non-limiting embodiments of the present disclosure.

Non-limiting embodiments of the present disclosure will be described in detail below. Examples of the non-limiting embodiments are illustrated in the accompanying drawings, where the same or like reference numerals throughout the figures indicate the same or like elements having the same or like functions. The non-limiting embodiments described below with reference to the accompanying drawings are exemplary and are intended only to explain the present disclosure instead of being construed as limiting the present disclosure.

In the description of the present disclosure, it should be understood that, descriptions relating to orientation, for example, orientation or positional relationships indicated by "up", "down", "front", "rear", "left", "right", etc. are based on the orientation or positional relationships shown in the accompanying drawings, and are to facilitate the description of the present disclosure and simplify the description only, rather than indicating or implying that the device or element referred to must have a specific orientation or be constructed and operated in a specific orientation, and therefore cannot be construed as limiting the present disclosure. In addition, the meaning of "several" is one or more, the meaning of "a plurality of" is two or more, "greater than", "less than", "more than", etc. are to be understood to exclude the given figure, and "above", "below", "within", etc. are understood to include the given figure. If "first" and "second", etc. are referred to, it is only for the purpose of distinguishing technical features, and shall not be understood as indicating or implying relative importance or implying the number of the indicated technical features or implying the sequence of the indicated technical features.

In the description of the present disclosure, unless otherwise explicitly defined, the words such as "set", "install", and "connect" should be understood in a broad sense, and those skilled in the art can determine the specific meanings of the above words in the present disclosure in a rational way in combination with the specific contents of the technical solutions.

A retractable power outlet according to non-limiting embodiments of the present disclosure is described below with reference to FIG. 1 to FIG. 4.

The retractable power outlet according to non-limiting embodiments of the present disclosure includes a mounting base 110 and an outlet body 600 arranged in front of the mounting base 110. A plurality of first connecting rods 200 are arranged between the mounting base 110 and the outlet body 600 in sequence. The outlet body 600, the mounting base 110 and the first connecting rods 200 are all called unit components, and a connecting member 300 is arranged between two adjacent unit components. Each of the connecting members 300 is hinged with two unit components, with a hinged shaft at a respective hinged part vertically arranged. The connecting members 300 are arranged at both ends of the first connecting rod 200.

For example, as shown in FIG. 1, the outlet body 600 is arranged right in front of the mounting base 110, and the plurality of connecting members 300 are alternately arranged from front to back. The connecting members 300 may be hinged shafts, so that the connecting members 300 are coaxial with the hinged shaft at the hinged part of two unit components, that is, two adjacent unit components are hinged with each other.

Figure 3:
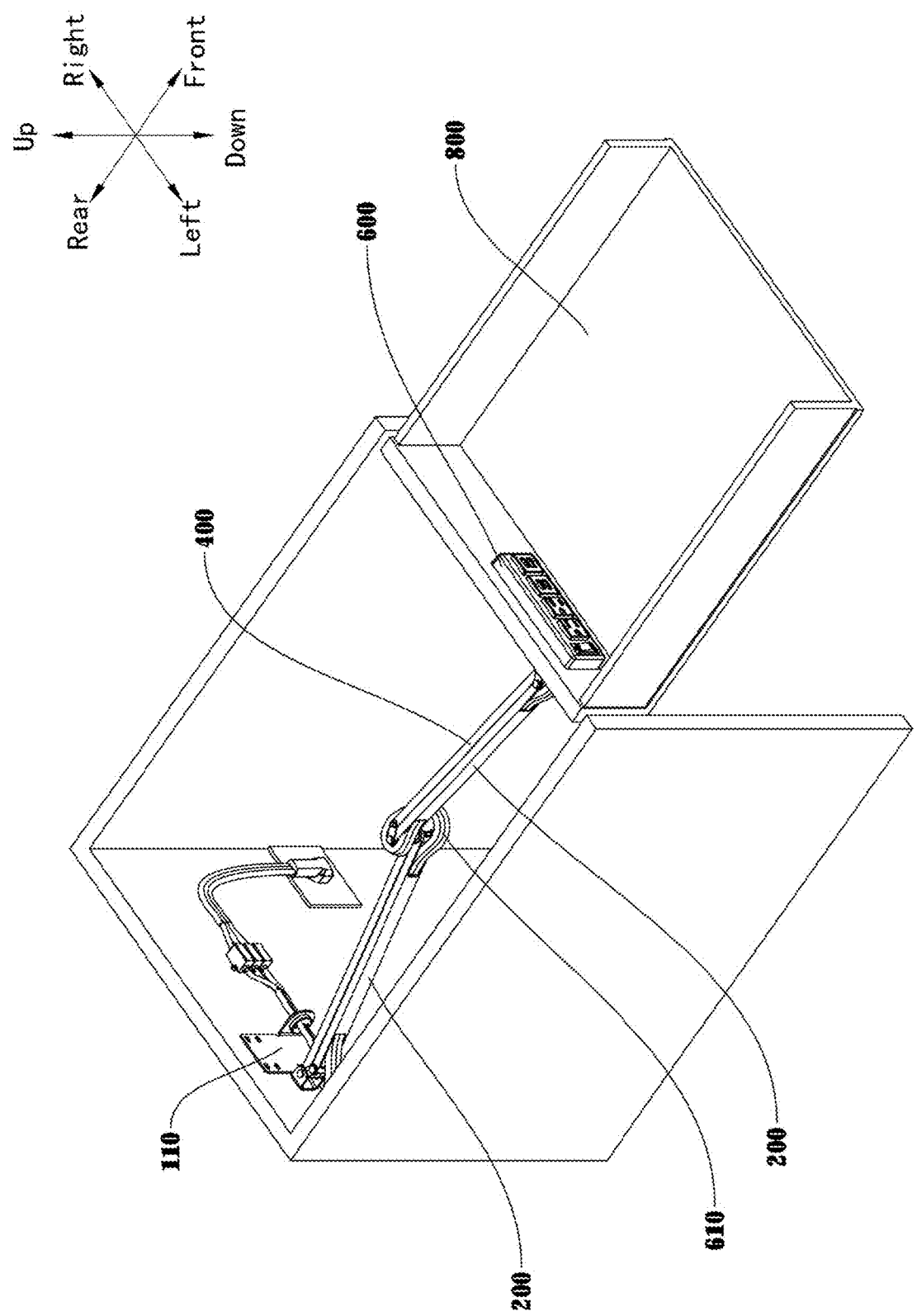
FIG. 3 is a schematic view showing the retractable power outlet in use according to some non-limiting embodiments of the present disclosure.

When in use, the mounting base 110 may be fixed on a wall. When a plug needs to be inserted or pulled out, the outlet body 600 and a movable base may be moved away from the wall first, so that the outlet body 600 can be moved to a relatively spacious place, which is convenient for the plug to be inserted or pulled out. Referring to FIG. 3, the retractable power outlet may also be applied to a drawer 800, that is, the movable base and the outlet body 600 are mounted on a side wall of the drawer 800. When in use, an electronic device such as a mobile phone may be placed in the drawer 800 for charging, and the outlet body 600 can be pulled out at the same time when the drawer 800 is pulled out, which is convenient for inserting and pulling out a charger of the mobile phone.

Figure 4:
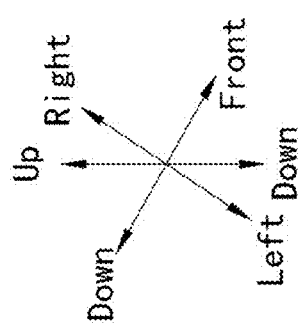
FIG. 4 is a schematic perspective view of a retractable power outlet according to some non-limiting embodiments of the present disclosure.
Figure 4:
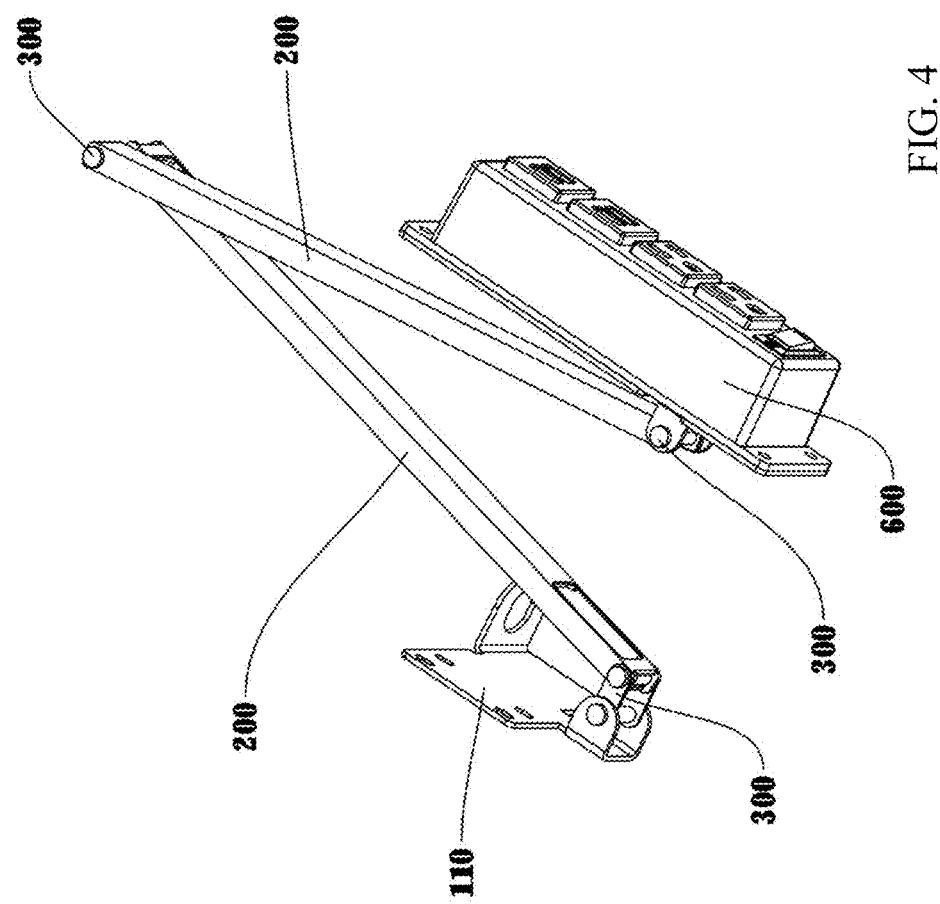

In some non-limiting embodiments of the present disclosure, at least one of the connecting members 300 is a connecting base, the connecting base is provided with two first hinged points, the two first hinged points are arranged at an interval, and the connecting base is respectively hinged with two adjacent unit components in the plurality of unit components through the two first hinged points. The connecting base is connected between two unit components, where one unit component is hinged to one first hinged point and the other unit component is hinged to the other first hinged point. Referring to FIG. 4, the connecting member 300 connected with the mounting base 110 is the connecting base, and the remaining connecting members 300 are the hinged shafts. By arranging the connecting base, the two unit components hinged with the connecting base can be displaced relative to each other in a lateral direction, so that the outlet body 600 can be laterally displaced relative to the mounting base 110 even when the outlet body 600 is close to the mounting base 110. In practical application, a mounting position of the mounting base 110 may have a certain lateral deviation from a mounting position of the retractable power outlet, which is convenient for the mounting of the retractable power outlet.

Figure 2:
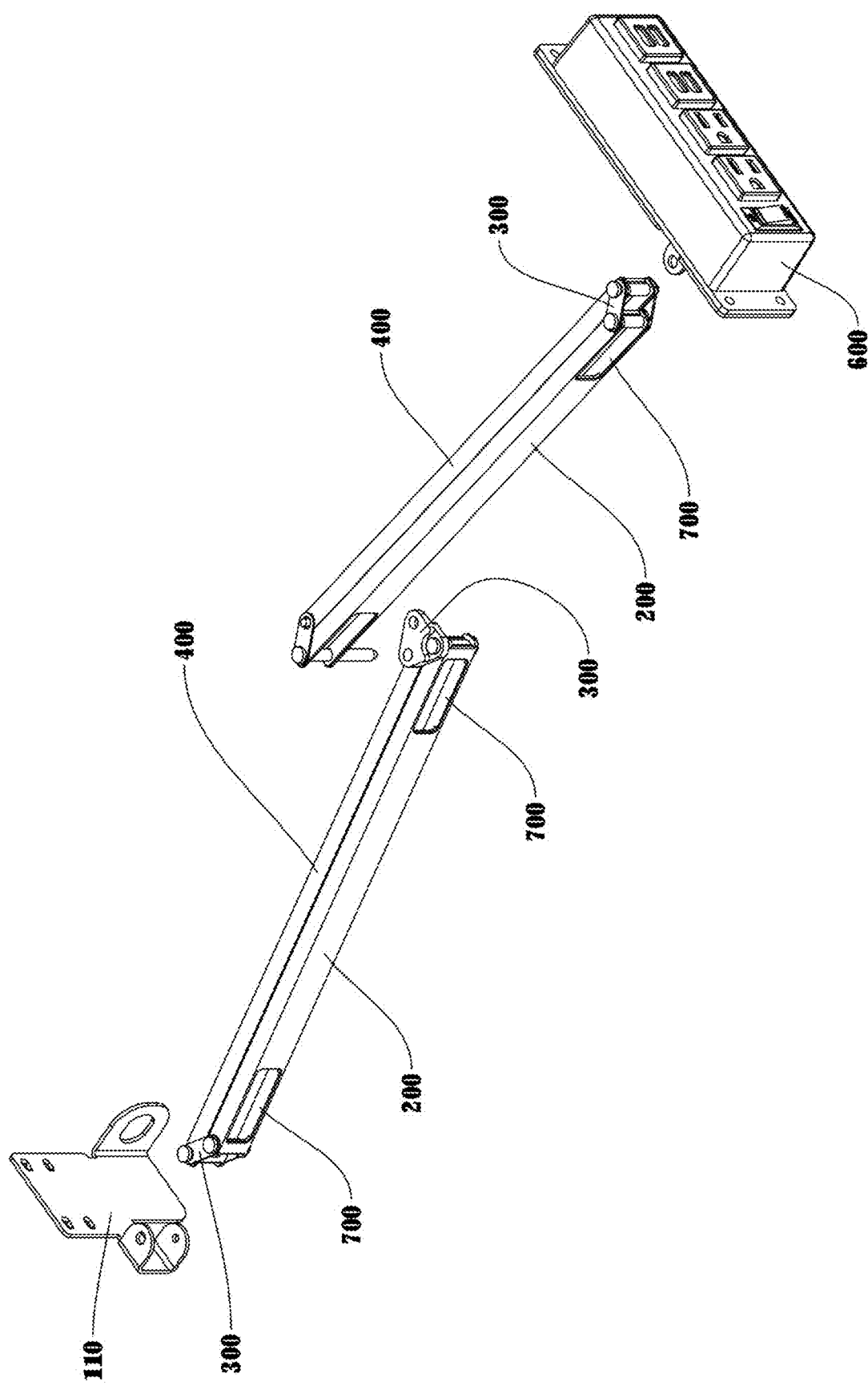
FIG. 2 is a schematic exploded view of the retractable power outlet according to some non-limiting embodiments of the present disclosure.

In some non-limiting embodiments of the present disclosure, a side of each first connecting rod 200 is provided with a second connecting rod 400, and two ends of the second connecting rod 400 are respectively hinged with two connecting members 300. Referring to FIG. 2, each connecting member 300 is provided with more than two hinged points to respectively hinge with the first connecting rod 200 and the second connecting rod 400. Height positions of the second connecting rod 400 and the first connecting rod 200 are the same, and the second connecting rod 400 is parallel to the first connecting rod 200. The first connecting rod 200, the second connecting rod 400 and the two connecting members 300 form a quadrilateral mechanism, so that an orientation of the outlet body 600 can be kept unchanged during moving, which is convenient for the plug to be inserted or pulled out. In some non-limiting embodiments of the present disclosure, the first connecting rod 200 and the second connecting rod 400 have a same length, and the two connecting member 300 hinged to both ends of the first connecting rod 200 and the second connecting rod 400 are also parallel to each other and also have a same length, such that the quadrilateral mechanism forms a parallelogram mechanism. Meanwhile, since both the first connecting rod 200 and the second connecting rod 400 have a certain width, when the first connecting rod 200 and the second connecting rod 400 are hinged and rotated through the connecting member 300, they will be clamped to each other after abutting against each other, thus preventing the rotation from continuing. Moreover, the above rotation restriction can also cause two adjacent groups of connecting rods (the first connecting rod 200 and the second connecting rod 400) connected to the same connecting member 300 at one side to have an excessive angle in the rotation process, that is, to have over-folding.

When the mounting base 110 or the outlet body 600 is hinged with the connecting member 300 connected thereto, damping of the hinge between the mounting base 110 or the outlet body 600 and the connecting member 300 may be set to be greater than damping of the quadrilateral mechanism, so that the orientation of the outlet body 600 can be kept by forward and backward movement during normal use. When mounting the retractable power outlet, the relative positions of the outlet body 600 and the mounting base 110 in the lateral direction may also be adjusted.

In some non-limiting embodiments of the present disclosure, vertical positions of the plurality of first connecting rods 200 are not coincident with each other. In this way, when the outlet body 600 is close to the mounting base 110, the plurality of first connecting rods 200 may be stacked along a vertical direction, and occupy less space in a front and rear direction, which is beneficial for the outlet body 600 to be closer to the mounting base 110.

In some non-limiting embodiments of the present disclosure, a number of the first connecting rods 200 is two. In this way, general needs can be satisfied, and the retractable power outlet has a simple structure and low cost, which is conducive to popularization and application.

In some non-limiting embodiments of the present disclosure, the first connecting rod 200 is provided with a wiring structure. The wiring structure may be a buckle, a strap or other suitable structure, as long as the power cord 610 can be attached to the first connecting rod 200. By arranging the wiring structure, the power cord 610 for supplying power to the outlet body 600 can be wired along the first connecting rod 200, thus preventing the power cord 610 from sagging and shaking.

In some non-limiting embodiments of the present disclosure, the outlet body 600 is provided with the power cord 610, and the power cord 610 is connected with the wiring structure. In this way, the power cord 610 can be prevented from sagging and shaking, which reduces a risk that the power cord 610 is accidentally pulled off.

In some non-limiting embodiments of the present disclosure, the wiring structure is a wiring channel, and the wiring channel extends along an axial direction of the first connecting rod 200. The first connecting rod 200 has a tubular structure at the wiring channel, and an interior of the tubular structure is the wiring channel. In this way, the structure is simple, and the power cord 610 can be connected with the first connecting rod 200 by passing the power cord 610 through the wiring channel.

In some non-limiting embodiments of the present disclosure, the wiring channel is provided with two openings 700, and the two openings 700 are respectively arranged at two ends of the first connecting rod 200. In this way, a length of the wiring channel is larger, and the wiring channel wraps the power cord 610 to protect the power cord 610 and improve the safety performance.

In some non-limiting embodiments of the present disclosure, the two openings 700 are both arranged on a peripheral wall of the wiring channel and located in a side of the first connecting rod 200 far away from the second connecting rod. The two openings 700 are both arranged between the two hinged shafts of the first connecting rod 200, and the openings 700 penetrate a side wall of the first connecting rod 200 along a radial direction, and the power cord 610 enters and exits the wiring channel along the radial direction of the first connecting rod 200. And then, the power cord 610 winds around the hinged shaft of the first connecting rod 200 at the opening 700 of the wiring channel and extends to another first connecting rod 200, and the hinged shaft arranged at the end of the first connecting rod 200 will not hinder the wiring of the power cord 610.

What is claimed is:

1. A retractable power outlet, comprising:
   a plurality of unit components, wherein the plurality of unit components comprise:
   a mounting base;
   an outlet body arranged at one side of the mounting base; and
   a plurality of connecting members, wherein each of the plurality of connecting members is hinged between two adjacent unit components of the plurality of unit components through a vertically arranged hinged shaft,
   wherein the plurality of unit components further comprise:
   a plurality of first connecting rods arranged between the mounting base and the outlet body; and
   a plurality of second connecting rods each arranged at a side of a respective one of the first connecting rods,
   wherein two ends of each of the first connecting rods and two ends of each of the second connecting rods are both respectively hinged with two of the connecting members, each connecting member is provided with at least two hinged points, and each of the plurality of first connecting rods and a respective second connecting rod of the plurality of second connecting rods are respectively hinged to the respective two connecting members of the plurality of connecting members through the respective at least two hinged points,
   wherein each of the plurality of first connecting rods is parallel to the respective second connecting rod, such that a plurality of quadrilateral mechanisms is formed each comprising one first connecting rod, one respective second connecting rod and two respective connecting members,
   wherein the retractable power outlet is configured such that, for each of the plurality of quadrilateral mechanisms, a distance is provided between the respective first connecting rod and the respective second connecting rod when the retractable power outlet moves between a collapsed position and an extended position, and
   wherein, when the respective first connecting rod and the respective second connecting rod of one of the quadrilateral mechanisms abut against each other, rotation of the respective quadrilateral mechanism is prevented from continuing.

2. The retractable power outlet according to claim 1, wherein at least one of the plurality of connecting members is a connecting base, the connecting base is provided with two first hinged points, the two first hinged points are arranged at an interval, and the connecting base is respectively hinged with two adjacent unit components in the plurality of unit components through the two first hinged points.

3. The retractable power outlet according to claim 1, wherein vertical positions of the plurality of first connecting rods are not coincident with each other.

4. The retractable power outlet according to claim 1, wherein a number of the plurality of first connecting rods is two.

5. The retractable power outlet according to claim 1, wherein the respective first connecting rod and the respective second connecting rod of each quadrilateral mechanism have a same length, and the respective two connecting members of each quadrilateral mechanism are parallel to each other and also have a same length, such that the respective quadrilateral mechanism forms a parallelogram mechanism.

6. The retractable power outlet according to claim 1, wherein the first connecting rod and the second connecting of the quadrilateral mechanism are located at a same height position.

7. The retractable power outlet according to claim 1, wherein each of the plurality of first connecting rods is provided with a wiring structure, wherein the outlet body is provided with a power cord connected with the wiring structure, wherein the wiring structure is a wiring channel that extends along an axial direction of the respective first connecting rod, and
wherein the wiring channel comprises:
two openings respectively arranged at two ends of the respective first connecting rod in a side far away from the second connecting rod, the two openings being both arranged on a peripheral wall of the wiring channel.

8. The retractable power outlet according to claim 7, wherein the power cord winds around the hinged shaft of the first connecting rod and extends to another first connecting rod.

9. A retractable power outlet, comprising:
a plurality of unit components, wherein the plurality of unit components comprise:
a mounting base;
an outlet body arranged at one side of the mounting base; and
a plurality of connecting members, wherein each of the plurality of connecting members is hinged between two adjacent unit components of the plurality of unit components through a vertically arranged hinged shaft,
wherein the plurality of unit components further comprise:
a plurality of first connecting rods arranged between the mounting base and the outlet body; and
a plurality of second connecting rods each arranged at a side of a respective one of the first connecting rods,
wherein two ends of each of the first connecting rods and two ends of each of the second connecting rods are both respectively hinged with two of the connecting members,
wherein each of the plurality of first connecting rods is provided with a wiring structure, the outlet body is provided with a power cord connected with the wiring structure, and the wiring structure is a wiring channel that extends along an axial direction of the respective first connecting rod, and
wherein the wiring channel comprises:
two openings respectively arranged at two ends of the respective first connecting rod in a side far away from the second connecting rod, the two openings being both arranged on a peripheral wall of the wiring channel,
wherein the power cord enters the wiring channel through a first of the two openings and exits the wiring channel through a second of the two openings.

10. The retractable power outlet according to claim 9, wherein the power cord winds around the hinged shaft of the first connecting rod and extends to another first connecting rod.

\* \* \* \* \*